(12) United States Patent
Lee

(10) Patent No.: US 11,567,494 B2
(45) Date of Patent: Jan. 31, 2023

(54) ENHANCING PERFORMANCE OF LOCAL DEVICE

(71) Applicant: LG ELECTRONICS INC., Seoul (KR)

(72) Inventor: Kwangyong Lee, Suwon-si (KR)

(73) Assignee: LG ELECTRONICS INC., Seoul (KR)

( * ) Notice: Subject to any disclaimer, the term of this patent is extended or adjusted under 35 U.S.C. 154(b) by 190 days.

(21) Appl. No.: 16/847,213

(22) Filed: Apr. 13, 2020

(65) Prior Publication Data
US 2021/0208582 A1 Jul. 8, 2021

(30) Foreign Application Priority Data
Jan. 2, 2020 (KR) .................. 10-2020-0000457

(51) Int. Cl.
| | |
|---|---|
| *G05D 1/00* | (2006.01) |
| *G05D 1/02* | (2020.01) |
| *G01C 21/34* | (2006.01) |
| *B60R 11/04* | (2006.01) |
| *G06K 9/62* | (2022.01) |
| *G06V 20/20* | (2022.01) |
| *G06V 20/56* | (2022.01) |

(52) U.S. Cl.
CPC ............ *G05D 1/0038* (2013.01); *B60R 11/04* (2013.01); *G01C 21/3407* (2013.01); *G05D 1/0231* (2013.01); *G06K 9/6259* (2013.01); *G06V 20/20* (2022.01); *G06V 20/56* (2022.01); *G05D 2201/0213* (2013.01)

(58) Field of Classification Search
CPC .... G05D 1/0038; G05D 1/0231; B60R 11/04; G06K 9/00671; G06K 9/00791; G06K 9/6259; G06K 9/6201; G06K 9/627; G06T 19/20; G06T 7/11; G06T 7/30; G06T 19/006; G06N 3/08
See application file for complete search history.

(56) References Cited

U.S. PATENT DOCUMENTS

| | | | | |
|---|---|---|---|---|
| 10,268,191 | B1* | 4/2019 | Lockwood | ........... G05D 1/0027 |
| 10,325,407 | B2* | 6/2019 | Lanier | .................... G06F 1/1686 |
| 10,468,062 | B1* | 11/2019 | Levinson | .............. G01S 7/4802 |
| 11,073,975 | B1* | 7/2021 | Mueller | ................ G06F 3/0482 |
| 2016/0299685 | A1* | 10/2016 | Zhai | .................... G06F 3/04886 |

(Continued)

*Primary Examiner* — Faris S Almatrahi
*Assistant Examiner* — Abdalla A Khaled
(74) *Attorney, Agent, or Firm* — Birch, Stewart, Kolasch & Birch, LLP

(57) ABSTRACT

A method for improving performance of a local device based on guide data from a remote device, according to one embodiment of the present disclosure, includes transmitting, to the remote device, first image data generated by the local device at a first time point, receiving guide data related to the first image data from the remote device, and registering, by a processor, the guide data to second image data generated by the local device at a second time point, based on first spatial information on the first image data, wherein the second time point is a time point that is after the first time point. A trained model for object recognition according to the present disclosure may include a deep neural network generated through machine learning, and the transmitting of the guide data may be performed in an Internet of Things (IoT) environment using a 5G network.

14 Claims, 10 Drawing Sheets

(56) References Cited

U.S. PATENT DOCUMENTS

| | | | |
|---|---|---|---|
| 2018/0089563 A1* | 3/2018 | Redding | G06N 3/0454 |
| 2018/0276899 A1* | 9/2018 | Liao | G06T 19/00 |
| 2019/0294923 A1* | 9/2019 | Riley | G06K 9/6267 |
| 2019/0370617 A1* | 12/2019 | Singh | G06N 3/088 |
| 2020/0104678 A1* | 4/2020 | Nixon | G06N 3/0472 |
| 2020/0167651 A1* | 5/2020 | Lvov | G06F 9/5066 |
| 2020/0349365 A1* | 11/2020 | Behrendt | G06K 9/00805 |
| 2021/0035367 A1* | 2/2021 | Verma | G06T 19/006 |
| 2021/0150757 A1* | 5/2021 | Mustikovela | G06V 20/56 |
| 2021/0303835 A1* | 9/2021 | Batra | G06N 3/0454 |
| 2022/0083153 A1* | 3/2022 | Kim | G06N 3/08 |

* cited by examiner

ENHANCING PERFORMANCE OF LOCAL DEVICE

CROSS-REFERENCE TO RELATED APPLICATION

This present application claims benefit of priority to Korean Patent Application No. 10-2020-0000457, entitled "ENHANCING PERFORMANCE OF LOCAL DEVICE" and filed on Jan. 2, 2020, in the Korean Intellectual Property Office, the entire disclosure of which is incorporated herein by reference.

BACKGROUND OF THE DISCLOSURE

1. Field of the Disclosure

The present disclosure relates to a technology for improving performance of a local device using a remote device.

2. Description of Related Art

Augmented reality (AR) refers to a technology that synthesizes virtual information in a real-world environment and displays the synthesized result on a display.

Among related technology using augmented reality, there exists technology that shows a user an image of a real-world environment with advertisements inserted therein. In addition, when repairing a device such as a car, there exists technology that helps to facilitate the repairing of the device by displaying the interior of the device to be repaired together with an actual image based on augmented reality.

In addition, as a method for training a machine learning-based trained model, there exists not only a batch learning method that uses all training data, but also an incremental learning method that trains a previously obtained trained model by using new data whenever the new data is added.

SUMMARY OF THE DISCLOSURE

The present disclosure is directed to providing a technology for improving performance of a local device by using guide data generated by a remote device based on image data generated by the local device.

In addition, the present disclosure is further directed to providing, through the use of guide data generated by a remote device, a technology for improving recognition capability of a machine learning-based trained model in a local device, which is capable of recognizing objects.

Moreover, the present disclosure is further directed to providing, through the use of guide data generated by a remote device, a technology for incrementally improving recognition capabilities of a machine learning-based trained model of a local device, which is capable of recognizing objects.

Furthermore, the present disclosure is further directed to providing, through the use of guide data generated by a remote device, a technology for improving the ability to find a moving or traveling route of a mobile robot or an autonomous vehicle that is a local device.

One embodiment of the present disclosure provides a method and a device for improving performance of a local device, by registering guide data generated by a remote device based on image data generated by the local device, to image data generated by the local device at a new time point and then displaying the registered data based on augmented reality.

Another embodiment of the present disclosure provides a method and a device for complementing object recognition performance of a local device, by registering guide data generated at a remote device by an input of a user of the remote device based on image data generated by the local device, to image data generated by the local device at a new time point, and then displaying the registered data based on augmented reality.

Another embodiment of the present disclosure provides a method and a device for improving recognition capability of a machine learning-based trained model in a local device, which is capable of recognizing objects, by training the machine learning-based trained model by using, as training data, guide data generated at a remote device by an input of a user of the remote device based on image data generated by the local device.

Another embodiment of the present disclosure provides a method and a device for improving the ability to find a moving or traveling route of a mobile robot or an autonomous vehicle that is a local device, by generating the moving or traveling route of the local device based on guide data generated at a remote device by an input of a user of the remote device based on image data generated by the local device.

A method for improving performance of a local device based on guide data from a remote device according to one embodiment of the present disclosure may include: transmitting, to the remote device, first image data generated by the local device at a first time point, receiving guide data related to the first image data from the remote device, and registering, by the processor, the guide data to second image data generated by the local device at a second time point, based on first spatial information on the first image data. The second time point may be a time point that is after the first time point.

Another embodiment of the present disclosure may provide a non-transitory computer readable recording medium storing a computer program configured to execute a method for improving performance of a local device based on guide data from a remote device.

A local device for improving its performance based on guide data from a remote device according to another embodiment of the present disclosure includes: a transceiver configured to transmit or receive data, a processor, and a memory operatively connected to the processor and configured to store at least one code executed by the processor, wherein the memory is configured to store at least one code that, when executed by the processor, causes the transceiver to transmit first image data generated at a first time point to the remote device and to receive guide data related to the first image data from the remote device, and causes the processor to register the guide data to second image data generated at a second time point, based on first spatial information on the first image data. The second time point may be a time point that is after the first time point.

The local device and the method at the local device for improving the performance based on the guide data from the remote device according to the embodiments of the present disclosure can reduce economic or time consumption required for improving the performance of the local device.

In addition, the local device and the method at the local device for improving the performance based on the guide data from the remote device according to the embodiments of the present disclosure can reduce training time required for training the machine learning-based trained model of the local device, which is capable of recognizing the objects, and also reduce the time required for collecting the training data.

Further, the local device and the method at the local device for improving the performance based on the guide data from the remote device according to the embodiments of the present disclosure can improve the ability to find the moving or traveling route of the mobile robot or the autonomous vehicle.

DETAILED DESCRIPTION

Figure 1:
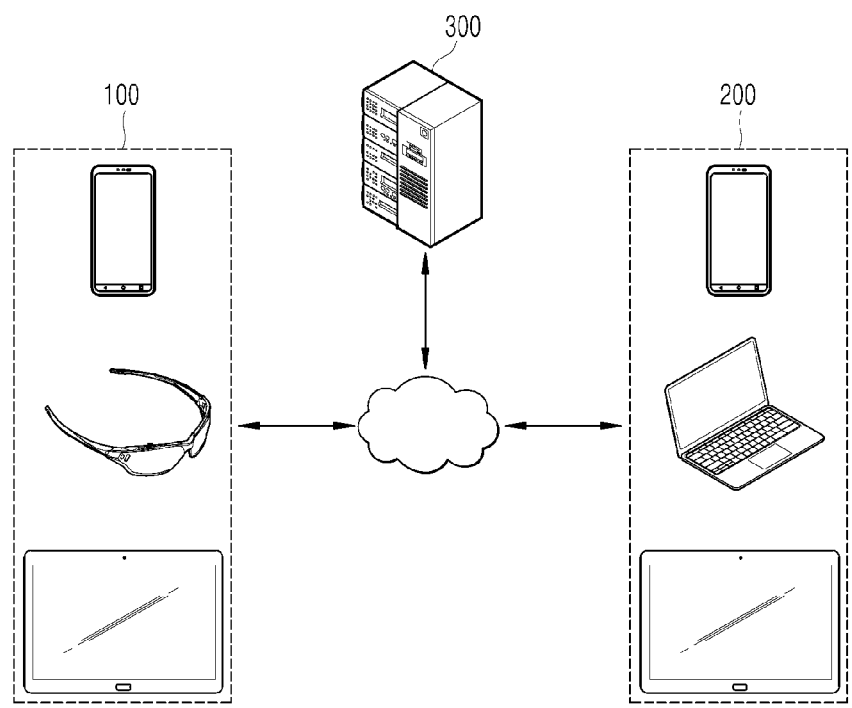
FIG. 1 is a view illustrating an environment for performing a method for improving performance of a local device based on guide data from a remote device, according to one embodiment of the present disclosure.

The embodiments disclosed in the present specification will be described in greater detail with reference to the accompanying drawings, and throughout the accompanying drawings, the same reference numerals are used to designate the same or similar components and redundant descriptions thereof are omitted. As used herein, the terms "module" and "unit" used to refer to components are used interchangeably in consideration of convenience of explanation, and thus, the terms per se should not be considered as having different meanings or functions. Wherever possible, the same reference numbers will be used throughout the drawings to refer to the same or like parts. In the following description, known functions or structures, which may confuse the substance of the present disclosure, are not explained. Further, the accompanying drawings are provided for more understanding of the embodiment disclosed in the present specification, but the technical spirit disclosed in the present invention is not limited by the accompanying drawings. It should be understood that all changes, equivalents, and alternatives included in the spirit and the technical scope of the present invention are included.

Although the terms first, second, third, and the like, may be used herein to describe various elements, components, regions, layers, and/or sections, these elements, components, regions, layers, and/or sections should not be limited by these terms. These terms are generally only used to distinguish one element from another.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present.

An environment in which performed is a method for improving performance of a local device based on guide data from a remote device according to one embodiment of the present disclosure will be described with reference to FIG. 1.

The environment may include a local device 100 and a remote device 200, and may further include a learning server 300.

The local device 100 may be a smartphone, a tablet, an AR glass, or a mobile robot, and may include a camera. The local device 100 may also be an autonomous vehicle.

The local device 100 may transmit, to the remote device 200, a first image data generated by the local device 100 at a first time point. The first image data may include an image captured by a camera mounted on the local device 100. In addition, when the local device 100 is the autonomous vehicle, the first image data may include an image corresponding to a portion of a map data held by a navigation system installed in the local device 100.

The local device 100 may store, as spatial information, at least one of an angle of view of the camera, posture information such as a tilt of the camera or the local device 100, or geographical coordinates, at a time point when the first image data is generated, or may transmit the spatial information to the remote device 200 together with the first image data.

The remote device 200 may be, for example, a smartphone, a tablet, and a computer, and may include a user input interface. The user input interface of the remote device 200 may include, for example, a touch display and a mouse.

The remote device 200 may generate guide data related to the received first image data. The guide data may be inputted by a user of the remote device 200. For example, the user of the remote device 200 may mark a specific portion of an image included in the first image data or may label a specific object of the image, through the touch display. The remote device 200 may transmit the generated guide data to the local device 100, or transmit image data including the guide data and the first image data to the local device 100. When the image data transmitted by the remote device 200 includes the guide data and the first image data, the guide data and the first image data may be distinguished from each other by separate layers. When the remote device 200 receives, from the local device 100, at least one of the angle of view of the camera, the posture information such as the tilt of the camera or the local device 100, or the geographical coordinates, the remote device 200 may transmit, for example, the angle of view of the camera back to the local device 100 upon transmitting the guide data to the local device 100.

The local device 100 may register the guide data received from the remote device 200 to a new second image data based on the spatial information on the first image data. Since the guide data generated by the remote device 200 is generated based on the first image data generated before the second image data is generated, the spatial information on the first image data needs to be reflected to register the guide data to the second image data. For example, the guide data is a marking marked on the specific object in the first image data. In addition, since the viewpoint of the camera when the camera generates the first image data is changed when the camera generates the second image data, the position of the specific object in the second image data may be changed. The local device 100 may register the guide data to the second image data such that the specific object is provided at the changed position in the second image data by changing the position of the marking marked on the specific object in consideration of the changed viewpoint of the camera.

The learning server 300 is a device or a server which is separately configured at the outside of the local device 100 and may perform the same function as the learning processor of the local device 100.

That is, the learning server 300 may be configured to receive, classify, store, and output information to be used for data mining, data analysis, intelligent decision making, and machine learning algorithms. Here, the machine learning algorithm may include a deep learning algorithm.

The learning server 300 may communicate with at least one local device 100, and derive a result by analyzing or learning the data on behalf of the local device 100. Here, the meaning of "on behalf of the other device" may be distribution of a computing power by means of distributed processing.

The learning server 300 of the artificial neural network is various devices for learning an artificial neural network and normally, refers to a server, and also referred to as a learning device.

Specifically, the learning server 300 may be implemented not only by a single server, but also by a plurality of server sets, a cloud server, or a combination thereof.

That is, the learning server 300 is configured as a plurality of learning devices to configure a learning server set (or a cloud server) and at least one learning server 300 included in the learning server set may derive a result by analyzing or learning the data through the distributed processing.

The learning server 300 may transmit a model trained by the machine learning or the deep learning to the local device 100 periodically or upon the request.

Figure 2:
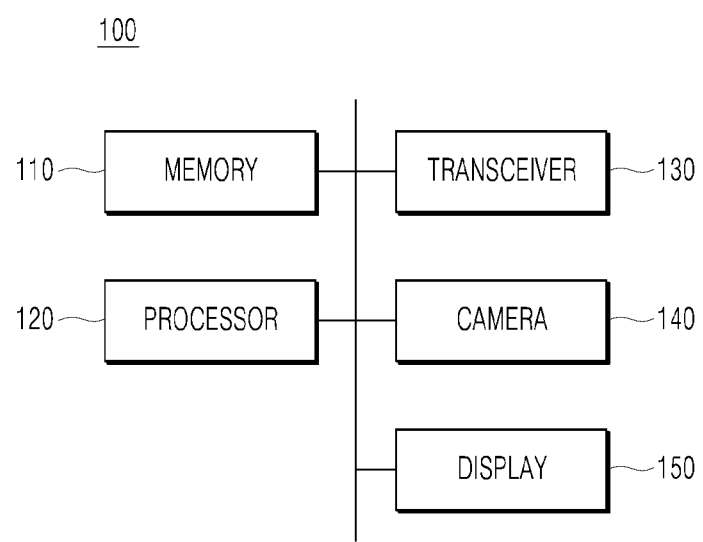
FIG. 2 is a block diagram illustrating a configuration of a local device for improving performance of the local device based on guide data from a remote device, according to one embodiment of the present disclosure.

A configuration of the local device 100 that improves performance of the local device based on the guide data from the remote device according to one embodiment of the present disclosure will be described with reference to FIG. 2.

The local device 100 may include a memory 110 that temporarily or non-temporarily stores a plurality of image data and the guide data received from the remote device 200, a processor 120 that registers the guide data to the image data, and a transceiver 130 that transmits and receives the guide data or the image data to and from the remote device 200.

The local device 100 may further include a camera 140 for capturing an image included in the image data, and a display 150 for displaying the guide data registered to the image data based on augmented reality.

When the local device 100 is the mobile robot, the local device 100 may include a driving module that includes, for example, a driver for movement control, wheels, and rails. When the local device 100 is the autonomous vehicle, the local device 100 may include a driving module that includes, for example, a driver for travel control and wheels.

The local device 100 may include a machine learning-based trained model capable of recognizing the object in the image.

Throughout the present specification, a machine learning-based artificial neural network trained using training data may be referred to as a trained model.

Artificial intelligence (AI) is an area of computer engineering science and information technology that studies methods to make computers mimic intelligent human behaviors such as reasoning, learning, and self-improving.

In addition, artificial intelligence does not exist on its own, but is rather directly or indirectly related to a number of other fields in computer science. In recent years, there have been numerous attempts to introduce an element of the artificial intelligence into various fields of information technology to solve problems in the respective fields.

Machine learning is an area of artificial intelligence that includes the field of study that gives computers the capability to learn without being explicitly programmed.

More specifically, machine learning is a technology that investigates and builds systems, and algorithms for such systems, which are capable of learning, making predictions, and enhancing their own performance on the basis of experiential data. The algorithms of the Machine Learning take a method of constructing a specific model in order to obtain the prediction or the determination based on the input data, rather than performing the strictly defined static program instructions.

Numerous machine learning algorithms have been developed for data classification in machine learning. Representative examples of such machine learning algorithms for data classification include a decision tree, a Bayesian network, a support vector machine (SVM), an artificial neural network (ANN), and so forth.

Decision tree refers to an analysis method that uses a tree-like graph or model of decision rules to perform classification and prediction.

Bayesian network may include a model that represents the probabilistic relationship (conditional independence) among a set of variables. Bayesian network may be appropriate for data mining via unsupervised learning.

SVM may include a supervised learning model for pattern detection and data analysis, heavily used in classification and regression analysis.

ANN is a data processing system modelled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

ANNs may refer generally to models that have artificial neurons (nodes) forming a network through synaptic interconnections, and acquires problem-solving capability as the strengths of synaptic interconnections are adjusted throughout training.

The terms 'artificial neural network' and 'neural network' may be used interchangeably herein.

An ANN may include a number of layers, each including a number of neurons. Furthermore, the ANN may include synapses that connect the neurons to one another.

An ANN may be defined by the following three factors: (1) a connection pattern between neurons on different layers; (2) a learning process that updates synaptic weights; and (3) an activation function generating an output value from a weighted sum of inputs received from a previous layer.

ANNs include, but are not limited to, network models such as a deep neural network (DNN), a recurrent neural network (RNN), a bidirectional recurrent deep neural network (BRDNN), a multilayer perception (MLP), and a convolutional neural network (CNN).

An ANN may be classified as a single-layer neural network or a multi-layer neural network, based on the number of layers therein.

An ANN may be classified as a single-layer neural network or a multi-layer neural network, based on the number of layers therein.

In general, a single-layer neural network may include an input layer and an output layer.

In general, a multi-layer neural network may include an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. Input signals between the neurons are summed together after being multiplied by corresponding connection strengths (synaptic weights), and if this sum exceeds a threshold value of a corresponding neuron, the neuron can be activated and output an output value obtained through an activation function.

A deep neural network with a plurality of hidden layers between the input layer and the output layer may be the most representative type of artificial neural network which enables deep learning, which is one machine learning technique.

An ANN can be trained using training data. Here, the training may refer to the process of determining parameters of the artificial neural network by using the training data, to perform tasks such as classification, regression analysis, and clustering of inputted data. Such parameters of the artificial neural network may include synaptic weights and biases applied to neurons.

An artificial neural network trained using training data can classify or cluster inputted data according to a pattern within the inputted data.

Throughout the present specification, an artificial neural network trained using training data may be referred to as a trained model.

Hereinbelow, learning paradigms of an artificial neural network will be described in detail.

Learning paradigms, in which an artificial neural network operates, may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regressor, and a function that predicts and outputs the class of an input vector may be referred to as a classifier.

In supervised learning, an artificial neural network can be trained with training data that has been given a label.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

Throughout the present specification, assigning one or more labels to training data in order to train an artificial neural network may be referred to as labeling the training data with labeling data.

Training data and labels corresponding to the training data together may form a single training set, and as such, they may be inputted to an artificial neural network as a training set.

The training data may exhibit a number of features, and the training data being labeled with the labels may be interpreted as the features exhibited by the training data being labeled with the labels. In this case, the training data may represent a feature of an input object as a vector.

Using training data and labeling data together, the artificial neural network may derive a correlation function between the training data and the labeling data. Then, through evaluation of the function derived from the artificial neural network, a parameter of the artificial neural network may be determined (optimized).

Unsupervised learning is a machine learning method that learns from training data that has not been given a label.

More specifically, unsupervised learning may be a training scheme that trains an artificial neural network to discover a pattern within given training data and perform classification by using the discovered pattern, rather than by using a correlation between given training data and labels corresponding to the given training data.

Examples of unsupervised learning include, but are not limited to, clustering and independent component analysis.

An ANN may be classified as a single-layer neural network or a multi-layer neural network, based on the number of layers therein.

Examples of artificial neural networks using unsupervised learning include, but are not limited to, a generative adversarial network (GAN) and an autoencoder (AE).

GAN is a machine learning method in which two different artificial intelligences, a generator and a discriminator, improve performance through competing with each other.

The generator may be a model generating new data that generates new data based on true data.

The discriminator may be a model recognizing patterns in data that determines whether inputted data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve so as to fool the discriminator as effectively as possible, while the discriminator evolves so as to distinguish, as effectively as possible, between the true data and the data generated by the generator.

An auto-encoder (AE) is a neural network which aims to reconstruct its input as output.

More specifically, AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data.

One semi-supervised learning technique involves reasoning the label of unlabeled training data, and then using this reasoned label for learning. This technique may be used advantageously when the cost associated with the labeling process is high.

Reinforcement learning may be based on a theory that given the condition under which a reinforcement learning agent can determine what action to choose at each time instance, the agent can find an optimal path to a solution solely based on experience without reference to data.

Reinforcement learning may be mainly performed by a Markov Decision Process (MDP).

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An artificial neural network is characterized by features of its model, the features including an activation function, a loss function or cost function, a learning algorithm, an optimization algorithm, and so forth. Also, the hyperparameters are set before learning, and model parameters can be set through learning to specify the architecture of the artificial neural network.

For instance, the structure of an artificial neural network may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size by which the model parameters are to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size, and may also include methods that increase optimization accuracy in SGD by adjusting the momentum and step direction. In SGD, a momentum and Nesterov accelerate gradient (NAG) are methods for increasing optimization accuracy by adjusting a step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network rely not only on the structure and learning optimization algorithms of the artificial neural network but also on the hyperparameters thereof. Therefore, in order to obtain a good learning model, it is important to choose a proper structure and learning algorithms for the artificial neural network, but also to choose proper hyperparameters.

In general, the artificial neural network is first trained by experimentally setting hyperparameters to various values, and based on the results of training, the hyperparameters can be set to optimal values that provide a stable learning rate and accuracy.

The trained model can be implemented in hardware, software, or a combination of hardware and software, and one or more instructions that constitute the trained model can be stored in the memory 110 when some or all of the trained models are implemented in software.

The local device 100 may receive the trained model from the learning server 300.

The local device 100 or the remote device 200 may be implemented as a stationary terminal and a mobile terminal, such as a mobile phone, a projector, a cell phone, a smartphone, a laptop computer, a terminal for digital broadcast, a personal digital assistant (PDA), a portable multimedia player (PMP), a navigation system, a slate PC, a tablet PC, an ultrabook, a wearable device (for example, a smartwatch, a smart glass, and a head mounted display (HMD)), a set-top box (STB), a digital multimedia broadcast (DMB) receiver, a radio, a laundry machine, a refrigerator, a desktop computer, a digital signage.

That is, the local device 100 or the remote device 200 may be implemented as various forms of home appliances for household use, and may be also applied to a stationary or mobile robot.

The transceiver 130 may include at least one of a broadcast receiving module, mobile communication module, wireless internet module, short-range communication module, and position information module.

The broadcast receiving module receives a broadcast signal and/or broadcast related information from an external broadcast management server through a broadcast channel.

The mobile communication module may transmit and receive wireless signals to and from at least one of a base station, an external terminal, and a server on a mobile communication network established according to technical standards or communication methods for mobile communications, for example, global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), and 5 generation (5G) communication.

The wireless internet module refers to a module for wireless internet access, and may be embedded in the local device 100 or the remote device 200, or externally. The wireless Internet module is configured to transmit and receive wireless signals over a communication network that is based on wireless Internet technologies.

The wireless internet technologies may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A).

The short-range communication module is for short-range communication, and can support the short-range communication by using at least one of Bluetooth (Bluetooth™) Radio Frequency Identification (RFID), Infrared Data Association (IrDA), Ultra Wideband (UWB), ZigBee, Near Field Communication (NFC), Wireless-Fidelity (WiFi), Wi-Fi Direct, and Wireless Universal Serial Bus (Wireless USB) technologies.

The position information module is a module for obtaining a position (or current position) of the mobile terminal, and a representative example thereof is a Global Positioning System (GPS) module or a Wireless Fidelity (WiFi) module. For example, when the local device 100 utilizes the GPS module, the local device 100 may obtain the position of the local device 100 using a signal transmitted from the GPS satellite.

The camera 140 processes an image frame such as a still image or a moving image obtained by an image sensor in a video call mode or a capturing mode. The processed image frame may be displayed on the display 150 or stored in the memory 110.

The local device 100 or the remote device 200 may include a user input interface.

The user input interface may include a mechanical type input tool (or a mechanical key, such as a button located on front and rear surfaces or a side surface of the local device 100 or the remote device 200, a dome switch, a jog wheel, and a jog switch) and a touchscreen input tool. For example, the touchscreen input interface may be formed by a virtual key, a soft key, or a visual key which is disposed on the touch screen through a software process or a touch key which is disposed on a portion other than the touch screen.

Figure 3:
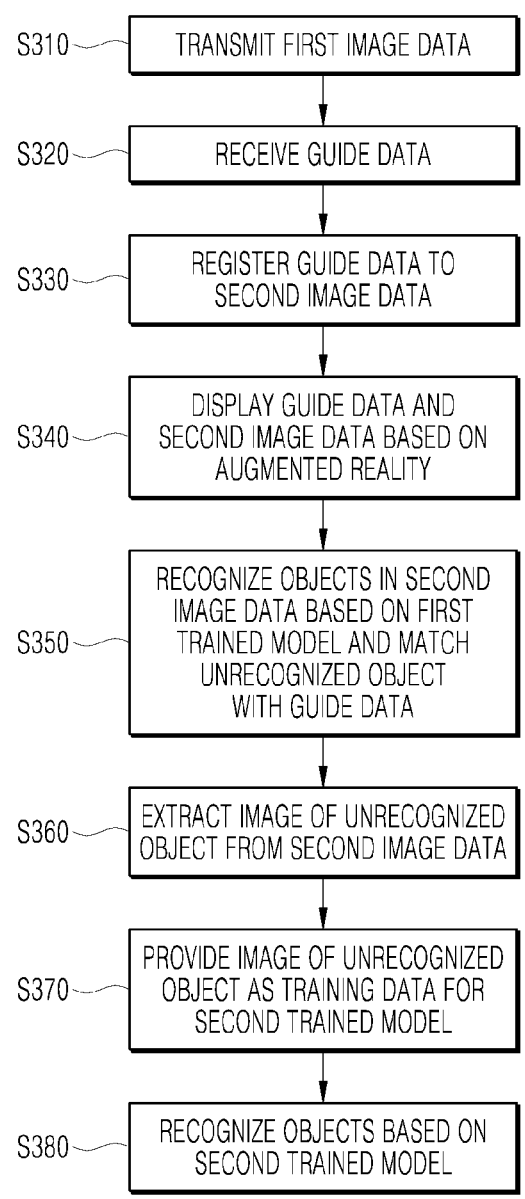
FIG. 3 is a flowchart illustrating a method for improving performance of a local device based on guide data from a remote device, according to one embodiment of the present disclosure.

A method for improving performance of the local device based on the guide data from the remote device according to one embodiment of the present disclosure will be described with reference to FIG. 3. The local device may be, for example, a smartphone, a tablet computer, or an AR glass that is equipped with a camera. The remote device may be, for example, a smartphone, a tablet computer, or a notebook computer that includes a user input interface.

The local device 100a may transmit, to the remote device 200a, the first image data generated at the first time point based on the first spatial information (S310).

Figure 4:
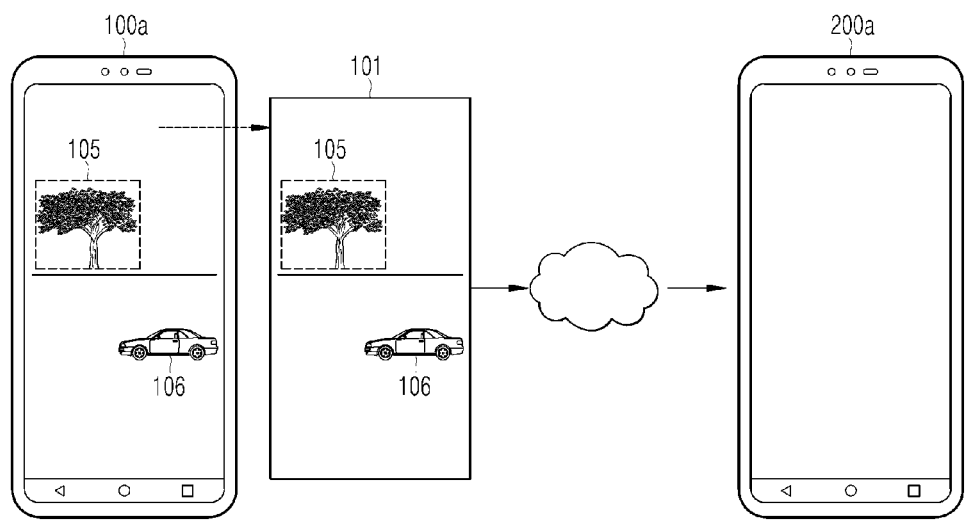
FIG. 4 is a view conceptually illustrating the transmission of first image data from a local device to a remote device, according to one embodiment of the present disclosure.

Referring to FIG. 4, the first image data may include an image 101 which is captured by a camera mounted on the local device 100a and on which the object 105 recognized by the machine learning-based trained model may be displayed. In addition, the image included in the first image data may include an unrecognized object 106 that is not recognized by the trained model of the local device 100a.

The trained model for recognizing the object may include CNN or Region-based CNN (R-CNN), Convolutional Recursive Neural Network (C-RNN), Fast R-CNN, Faster R-CNN, Region-based Fully Convolutional Network (R-FCN), You Only Look Once (YOLO), or Single Shot Multibox Detector (SSD).

Figure 5:
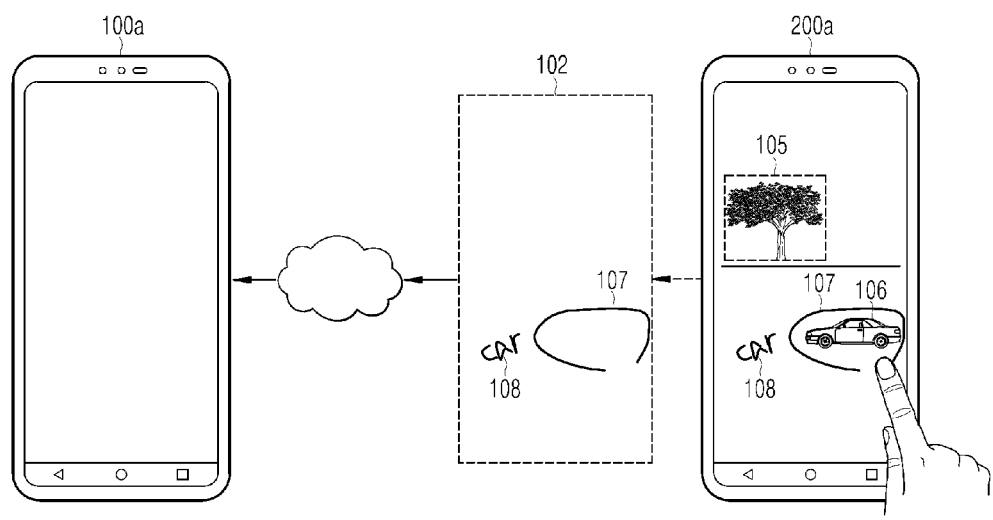
FIG. 5 is a view conceptually illustrating a local device receiving guide data from a remote device, according to one embodiment of the present disclosure.

Referring to FIG. 5, the remote device 200a may generate guide data 107 and 108 related to the received first image data. For example, when the remote device 200a includes a touchscreen display as a user input interface, a user of the remote device 200a may generate, through the touchscreen display, as the guide data, a marking 107 indicating an area of the unrecognized object 106 in the first image data, or a label 108 indicating the type of the unrecognized object 106.

The label 108 may be text data inputted by the user of the remote device 200a. Alternatively, the guide data may be another type of graphic data that is inputted by the user of the remote device 200a through the touchscreen display.

The local device 100a may receive, from the remote device 200a, the guide data generated based on the first image data (S320). The guide data may be received alone, or received together with the first image data in the form of a layering format 102.

The local device 100a may register, based on the spatial information on the first image data, the received guide data to the second image data generated after the first image data is generated (S330).

Figure 6:
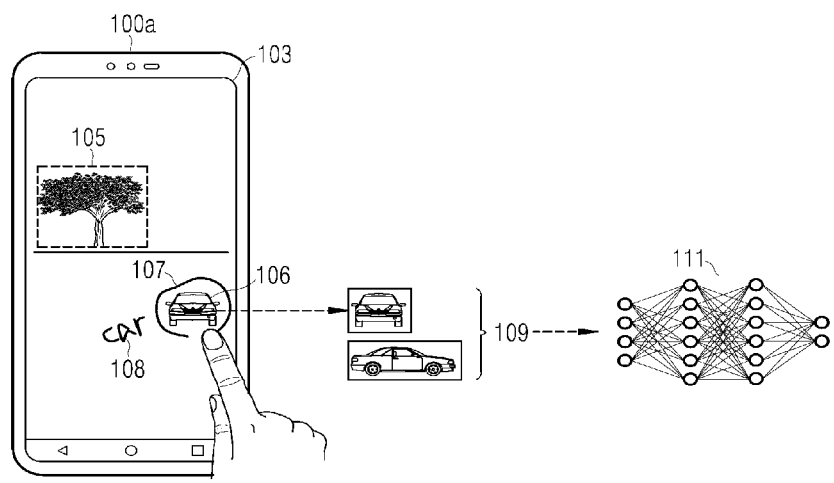
FIG. 6 is a view conceptually illustrating a local device generating training data for a trained model for object recognition using guide data, according to one embodiment of the present disclosure.
Figure 7:
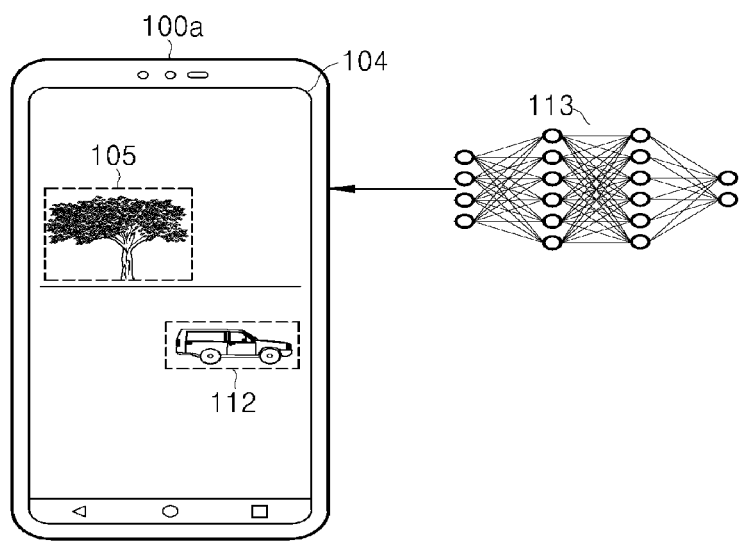
FIG. 7 is a view conceptually illustrating a local device recognizing an object based on a trained model for object recognition that improves recognition capability using guide data, according to one embodiment of the present disclosure.

For example, referring to FIG. 6, second image data 103 generated after the first image data (101 in FIG. 4) is generated, may include not only the objects 105 and 106 included in the first image data 101, but also images generated at different capturing angle of the camera. The local device 100a may estimate a position at which the guide data 107 and 108 should be displayed, based on spatial information including at least one of first angle of view information, first viewpoint information, first posture information, or first position information with respect to the camera at a time point when the first image data is captured.

The local device 100a may include one or more sensors for measuring the spatial information.

For example, the local device 100a may include at least one of a proximity sensor, an illumination sensor, a touch sensor, an acceleration sensor, a magnetic sensor, a G-sensor, a gyroscope sensor, or a motion sensor.

Then, when the estimated position of the guide data 107 and 108 is in the image of the second image data 103, based on augmented reality, the local device 100a may synthesize the guide data 107 and 108 into the second image data 103 at the estimated position, and then display the synthesized data on the display (S340). When, due to a change in the spatial information on the camera, for example due to a change in the viewpoint or the capturing direction of the camera, the objects 105 and 106 included in the first image data 101 are not included in the second image data and the estimated position of the guide data 107 and 108 is not in the image of the second image data, the local device 100a may not display the guide data 107, 108 on the display. Alternatively, the local device 100a may display, on the display, an indication indicating a direction of where the guide data 107 and 108 which are not displayed on the display are present.

The local device 100a may recognize the object 105 by applying a trained model for object recognition to the second image data, and indicate the recognized object 105 with, for example, a bounding box.

The local device 100a may match the unrecognized object 106 displayed at the estimated position of the marking 107 included in the guide data with the label 108 included in the guide data (S350). In one embodiment, when the label 108 included in the guide data is in a form of handwriting by touch input, the local device 100a or the remote device 200a may convert the handwriting into text data by a machine learning-based trained model that recognizes the handwriting.

Accordingly, when the unrecognized object materializes due to a lack of performance of the trained model of the local device, the type of unrecognized object may be displayed using the guide data from the remote device, thereby supplementing the object recognition capability of the local device.

The local device 100a may extract an image 109 of the unrecognized object 106 displayed at the estimated position of the marking 107 included in the guide data (S360). The local device 100a may extract a plurality of images 109 of the unrecognized object 106 that vary depending on changes in posture information (such as a capturing viewpoint, an angle of view, a capturing direction, or a tilt) on the mounted camera, or on changes in spatial information such as the position of the local device 100a (S360).

The local device 100a may provide the extracted image of the unrecognized object 106 as training data for a trained model 111 for object recognition (S370). The training data may be training data in which the label 108 of the guide data is matched with the extracted image of the unrecognized object 106.

The local device 100a or the learning server 300 may train the trained model 111 for object recognition by using the training data in which the label 108 of the guide data is matched with the image of the unrecognized object 106.

In one embodiment, the local device 100a or the learning server 300 may train the trained model 111 based on incremental learning. The local device 100a or the learning server 300 may train, by using the training data in which the label 108 of the guide data is matched with the image of the unrecognized object 106, a trained model in which parameters such as a weighting factor of the trained model 111 are partially changed. Accordingly, the local device 100a or the learning server 300 may greatly reduce training time and amount of computation consumed for the trained model 111 through training the trained model 111 by additionally using only training data of the unrecognized object rather than using all training data that has previously been used to train the trained model 111.

When the local device 100a trains the trained model by incremental learning, the local device 100a may include the learning processor.

The learning processor trains the model configured by an artificial neural network using the training data.

Specifically, the learning processor allows the artificial neural network to repeatedly learn using various learning techniques described above to determine optimized model parameters of the artificial neural network.

In this case, the learning model may be used to deduce a result for the new input data, rather than the training data.

The learning processor may be configured to receive, classify, store, and output information to be used for data mining, data analysis, intelligent decision making, and machine learning algorithm and techniques.

The learning processor may include one or more memory units configured to store data which is received, detected, sensed, generated, previously defined, or output by another component, device, the terminal, or a device which communicates with the terminal.

The learning processor may include a memory which is combined with or implemented in the terminal. In some embodiments, the learning processor may be implemented using the memory 110.

Selectively or additionally, the learning processor may be implemented using a memory related to the terminal, such as an external memory which is directly coupled to the terminal or a memory maintained in the server 200 which communicates with the terminal.

According to another exemplary embodiment, the learning processor may be implemented using a memory maintained in a cloud computing environment or other remote memory locations accessible by the terminal via a communication method such as a network.

The learning processor may be configured to store data in one or more databases to identify, index, categorize, manipulate, store, search, and output data in order to be used for supervised or non-supervised learning, data mining, predictive analysis, or used in the other machine. Here, the database may be implemented using the memory 110, a memory of the learning server 300, a memory maintained in a cloud computing environment or other remote memory locations accessible by the terminal via a communication method such as a network.

The local device 100a may recognize the object by applying, to third image data 104, a trained model 113 that is trained incrementally by the training data in which the label 108 of the guide data is matched with the image of the unrecognized object 106. Accordingly, the local device 100a can improve the performance of the local device 100a in a short time by allowing the new trained model 113 to recognize the object 112 that is not recognized by the previous trained model 111.

Figure 8:
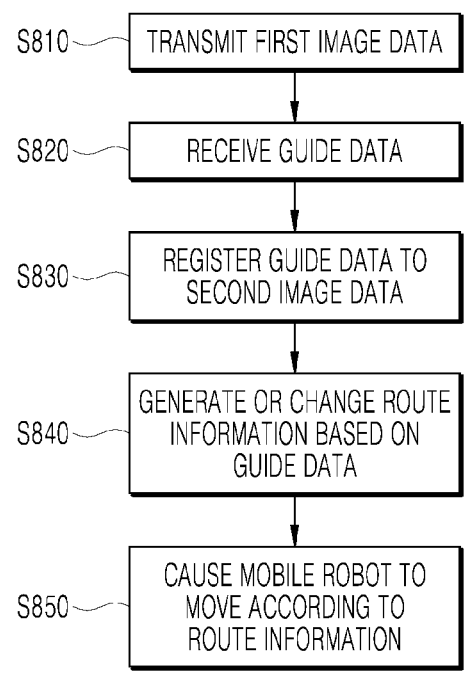
FIG. 8 is a flowchart illustrating another method for improving performance of a local device based on guide data from a remote device, according to one embodiment of the present disclosure.

Another method for improving performance of a local device based on guide data from a remote device according to one embodiment of the present disclosure will be described with reference to FIG. 8. The local device may be, for example, a mobile robot or a robot cleaner that is equipped with a camera. The remote device may be, for example, a smartphone, a tablet computer, or a notebook computer that includes a user input interface. Portions overlapping with the description of FIGS. 1 to 7 will be omitted.

Figure 9:
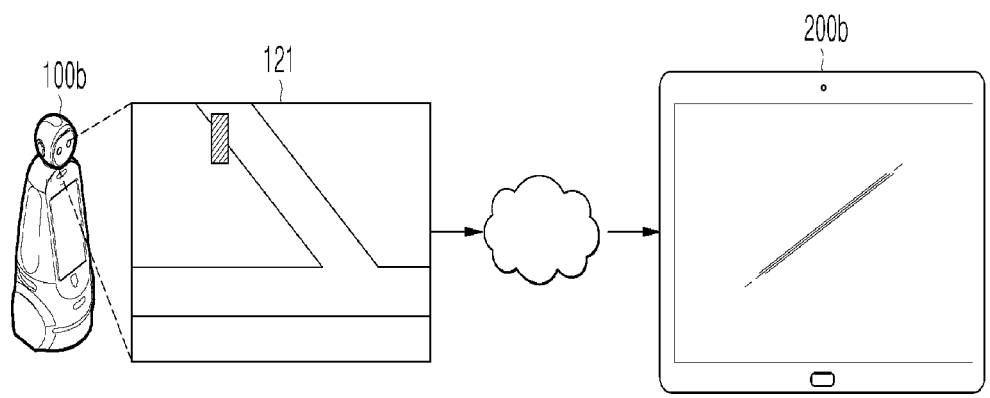
FIG. 9 is a view conceptually illustrating the transmission of first image data from a local device to a remote device, according to one embodiment of the present disclosure.

Referring to FIG. 9, a mobile robot 100b that is the local device may transmit, to a remote device 200b, first image data 121 generated at a first time point based on first spatial information (S810).

The first image data 121 may include an image 101 captured by a camera mounted on the mobile robot 100b based on the first spatial information at the first time point.

Figure 10:
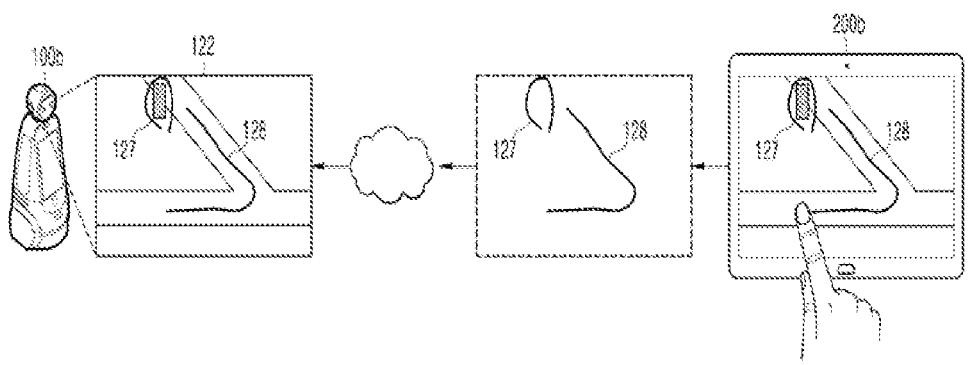
FIG. 10 is a view conceptually illustrating a local device receiving guide data from a remote device and registering the received guide data to second image data, according to one embodiment of the present disclosure.

Referring to FIG. 10, the remote device 200b may generate guide data 127 and 128 related to the received first image data. For example, when the remote device 200b includes a touchscreen display as a user input interface, a user of the remote device 200b may generate a marking 127 or a marking 128 as the guide data through the touchscreen display. Here, the marking 127 indicates a target point to which the mobile robot 100b should move in the first image data, and the marking 128 indicates a route to the target point.

The mobile robot 100b may receive the guide data from the remote device 200b (S820), wherein the guide data is generated based on the first image data. The guide data may be received alone, or received together with the first image data in the form of a layering format.

The mobile robot 100b may register, based on the spatial information on the first image data, the received guide data to second image data generated after the first image data is generated (S830).

For example, referring to FIG. 10, the second image data 122 generated after the first image data (121 in FIG. 9) is generated may include not only objects included in the first image data 121, but also images generated at a different capturing angle of the camera. The mobile robot 100b may estimate a position indicated by the guide data 127 and 128, based on spatial information including at least one of first angle of view information, first viewpoint information, first posture information, or first position information with respect to the camera at a time point when the first image data is captured. The mobile robot 100b may change a posture or a position such that the position indicated by the guide data 127 and 128 is included in the angle of view of the camera.

Figure 11:
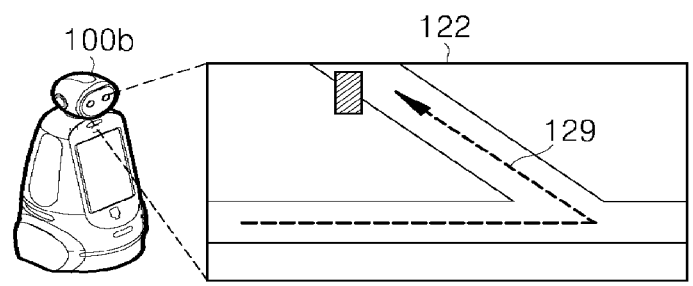
FIG. 11 is a view illustrating a concept for generating or changing a moving route based on guide data from a remote device, according to one embodiment of the present disclosure.

Referring to FIG. 11, the mobile robot 100b may recognize, for example, a building, an object, and a road included in the second image data 122 by a machine learning-based trained model for object recognition, and, based on the guide data 127 and 128, may generate route information 129 or change pre-generated route information (S840). The mobile robot 100b may move according to the generated or changed route information 129 by driving a driver (S850).

Accordingly, even when a surrounding environment is different from map information stored in the mobile robot 100b, the mobile robot 100b is able to improve the ability to determine a target point or route for movement based on the guide data from the remote device 200b. When the local device is the robot cleaner, the robot cleaner is able to improve the ability to determine a cleaning route based on the guide data from the remote device.

Figure 12:
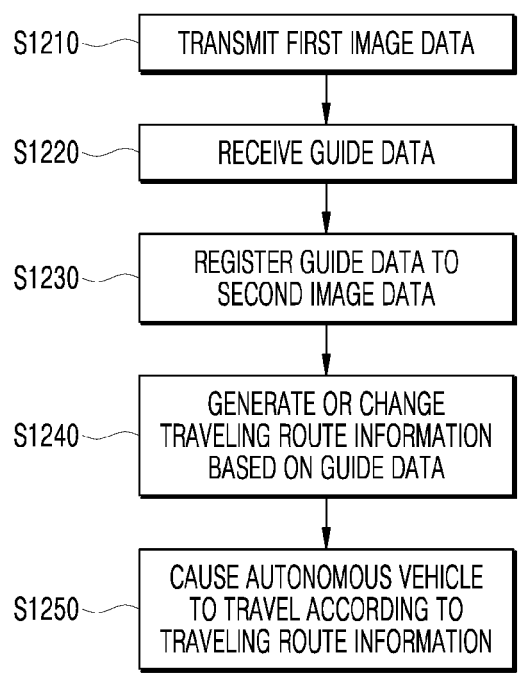
FIG. 12 is a flowchart illustrating another method for improving performance of a local device based on a guide data from a remote device, according to one embodiment of the present disclosure.

Another method for improving performance of a local device based on guide data from a remote device according to one embodiment of the present disclosure will be described with reference to FIG. 12. The local device may be an autonomous vehicle including a navigation system. The remote device may be, for example, a smartphone, a tablet computer, or a notebook computer that includes a user input interface. Portions overlapping with the description of FIGS. 1 to 11 will be omitted hereinafter.

Figure 13:
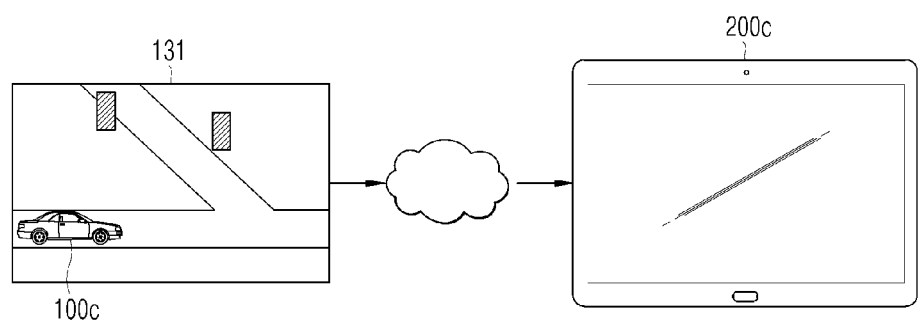
FIG. 13 is a view conceptually illustrating the transmission of first image data from a local device to a remote device, according to one embodiment of the present disclosure.

Referring to FIG. 13, an autonomous vehicle 100c, which is the local device, may transmit, to a remote device 200c, a first image data 131 generated at a first time point based on first spatial information (S1210). The first image data 131 may be map data including the position of the autonomous vehicle 100c at the first time point.

The first image data 131 may include a map generated by the navigation system installed in the autonomous vehicle 100c at the first time point based on the first spatial information (for example, the position and the traveling direction of the autonomous vehicle).

Figure 14:
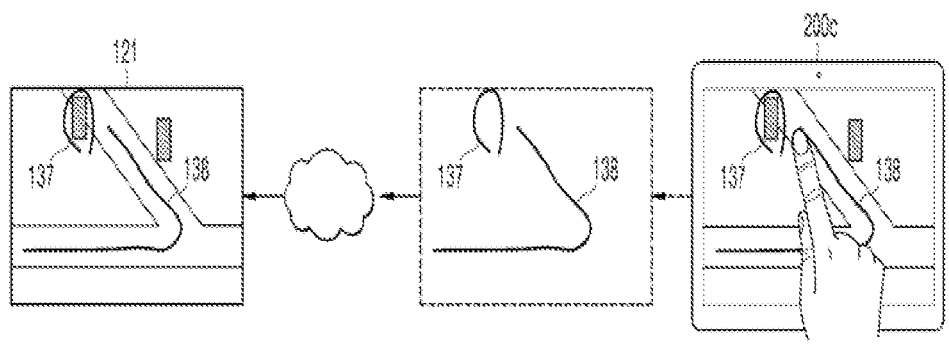
FIG. 14 is a view conceptually illustrating a local device receiving guide data from a remote device and registering the received guide data to second image data, according to one embodiment of the present disclosure.

Referring to FIG. 14, the remote device 200c may generate guide data 137 and 138 related to the received first image data. For example, when the remote device 200c includes a touchscreen display as a user input interface, a user of the remote device 200c may generate a marking 137 or a marking 138 as the guide data through the touchscreen display. Here, the marking 137 indicates a target point to which the autonomous vehicle 100c should move in the first image data and the marking 138 indicates a route to the target point.

The autonomous vehicle 100c may receive the guide data from the remote device 200c (S1220), wherein the guide data is generated based on the first image data. The guide data may be received alone, or received together with the first image data in the form of a layering format.

The autonomous vehicle 100c may register, based on the spatial information on the first image data, the received guide data to second image data generated after the first image data is generated (S1230).

For example, referring to FIG. 14, second image data 132 related to the changed position of the autonomous vehicle 100c after the first image data (131 in FIG. 13) is generated, may include not only objects such as a building or a road included in the first image data 131, but also a map related to other positions. The autonomous vehicle 100c may estimate the position indicated by the guide data 137 and 138 based on the spatial information including the position of the autonomous vehicle 100c at the time point when the first image data is generated.

Figure 15:
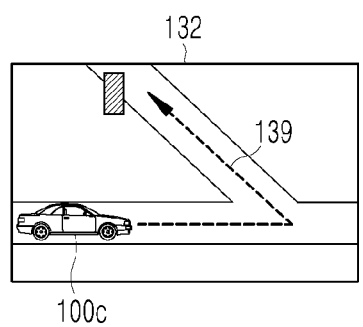
FIG. 15 is a view illustrating a concept for generating or changing a traveling route based on guide data from a remote device, according to one embodiment of the present disclosure.

Referring to FIG. 15, the autonomous vehicle 100c may recognize, for example, a building, an object, and a road included in the second image data 132 by a machine learning-based trained model for object recognition, and, based on the guide data 137 and 138, may generate traveling route information 139 or change pre-generated traveling route information (S1240). The autonomous vehicle 100*c* may travel according to the generated or changed traveling route information 139 by driving a driver (S1250).

The present disclosure described above can be embodied as computer-readable codes on a medium on which a program is recorded. The computer readable medium includes all types of recording devices in which data readable by a computer system can be stored. For example, the computer-readable media may include a hard disk drive (HDD), a solid state disk (SSD), a silicon disk drive (SDD), a ROM, a RAM, a CD-ROM, a magnetic tape, a floppy disk, and optical data storage devices. Moreover, the computer may include a processor of a local device.

The programs may be those specially designed and constructed for the purposes of the present disclosure or they may be of the kind well known and available to those skilled in the computer software arts. Examples of computer programs may include both machine codes, such as produced by a compiler, and higher-level codes that may be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

The order of individual steps in process claims according to the present disclosure does not imply that the steps must be performed in this order; rather, the steps may be performed in any suitable order, unless expressly indicated otherwise. The present disclosure is not necessarily limited to the order of operations given in the description. All examples described herein or the terms indicative thereof ("for example," "such as") used herein are merely to describe the present disclosure in greater detail. Therefore, it should be understood that the scope of the present disclosure is not limited to the example embodiments described above or by the use of such terms unless limited by the appended claims. Also, it should be apparent to those skilled in the art that various modifications, combinations, and alternations may be made depending on design conditions and factors within the scope of the appended claims or equivalents thereof.

It should be apparent to those skilled in the art that various substitutions, changes and modifications which are not exemplified herein but are still within the spirit and scope of the present disclosure may be made.

What is claimed is:

1. A method of controlling a local device to improve performance based on guide data from a remote device, the method comprising:
generating, by the local device, first image data at a first time point and first spatial information corresponding to the first image data;
transmitting, to the remote device, the first image data generated by the local device;
receiving augmented reality (AR) information including guide data related to the first image data from the remote device;
registering, by a processor of the local device, geographical coordinates of the guide data to geographical coordinates of second image data generated by the local device at a second time point after the first time point, based on the first spatial information;
calculating, by the processor of the local device, a display position of the guide data at which the guide data should be displayed on a display based on the registered geographical coordinates of the guide data; and
displaying, by the local device, an AR image including the guide data synthesized into the second image data on the display based on the display position of the guide data,
wherein the first image data and the second image data are image data captured by a camera mounted on the local device, and the first spatial information comprises at least one of first angle of view information, first viewpoint information of the camera, first posture information of the camera, or first position information of the camera, with respect to the camera at a time point when the first image data is captured,
wherein the guide data comprises a marking, marked on an object in the first image, by a user of the remote device based on the first image data,
wherein the registering the guide data to the second image data further comprises registering the guide data spatially to the second image data based on second spatial information including at least one of second angle of view information of the camera, second posture information of the camera, or second position information of the camera using a sensor for measuring the second spatial information, with respect to the camera at a time point when the second image data is captured, and
wherein the registering the guide data to the second image data comprises registering the marking to the second image data using a position of the object in the second image data, calculating a position of the marking on the object, by the processor of the local device, in consideration of the second angle of view information of the camera and displaying the marking on the object at the calculated position of the marking in the second image data.

2. The method of claim 1, further comprising:
recognizing objects included in the second image data by applying a machine learning-based first trained model to the second image data; and
matching an unrecognized object not recognized by the first trained model in the second image data with a label included in the guide data.

3. The method of claim 2, further comprising:
extracting an image of the unrecognized object from the second image data based on the guide data; and
providing the image of the unrecognized object and the label included in the guide data as training data for training a machine learning-based second trained model.

4. The method of claim 3, further comprising recognizing at least one object by applying the second trained model to third image data captured by the camera at a third time point, wherein the second trained model is a trained model that is generated based on parameters of the first trained model and is trained using only additional training data that includes the image of the unrecognized object and the label included in the guide data.

5. The method of claim 1, wherein the local device corresponds to a mobile robot,
wherein the method further comprises:

generating or changing route information based on the guide data; and causing the mobile robot to move according to the route information, and wherein the guide data is guide data inputted by a user of the remote device based on the first image data.

6. The method of claim 1, wherein the local device corresponds to an autonomous vehicle, wherein the method further comprises:

generating or changing traveling route information based on the guide data; and causing the autonomous vehicle to travel according to the traveling route information, and wherein the first image data and the second image data are map data comprising the position of the local device, and the first spatial information comprises first position information on the first image data.

7. A non-transitory computer readable recording medium storing a computer program configured to cause a computer to execute the method of claim 1 when executed by the computer.

8. A local device, comprising:

a display configured to display an image;

a transceiver configured to transmit or receive data;

a camera;

a processor; and a memory operatively connected with the processor and configured to store at least one code to be executed by the processor, wherein the processor is configured to:

generate first image data at a first time point and first spatial information corresponding to the first image data, transmit, to a remote device, the first image data generated by the local device, receive augmented reality (AR) information including guide data related to the first image data from the remote device, register geographical coordinates of the guide data to geographical coordinates of second image data generated by the local device at a second time point after the first time point, based on the first spatial information, calculate a display position of the guide data at which the guide data should be displayed on the display based on the registered geographical coordinates of the guide data, and display, via the display, an AR image including the guide data synthesized into the second image data, wherein the first image data and the second image data are image data captured by the camera, wherein the first spatial information comprises at least one of first angle of view information of the camera, first posture information of the camera, or first position information of the camera with respect to the camera at a time point when the first image data is captured, wherein the processor is further configured to register the guide data spatially to the second image data based on second spatial information including at least one of second angle of view information of the camera, second posture information of the camera, or second position information of the camera using a sensor for measuring the second spatial information with respect to the camera at a time point when the second image data is captured, wherein the guide data comprises a marking, marked on an object in the first image, by a user of the remote device based on the first image data, and wherein the processor is further configured to:

register the marking to the second image data using a position of the object in the second image data, calculate a position of the marking on the object in consideration of the second angle of view information of the camera, and display the marking on the object at the calculated position of the marking in the second image data.

9. The local device of claim 8, wherein the processor is further configured to:

recognize objects included in the second image data by applying a machine learning-based first trained model to the second image data; and match an unrecognized object not recognized by the first trained model in the second image data with a label included in the guide data.

10. The local device of claim 9, wherein the processor is further configured to:

extract an image of the unrecognized object from the second image data based on the guide data; and provide the image of the unrecognized object and the label included in the guide data as training data for training a machine learning-based second trained model.

11. The local device of claim 10, wherein the processor is further configured to recognize the unrecognized object by applying the second trained model to third image data captured by the camera, and wherein the second trained model is a trained model that is trained using only additional training data that comprises the image of the unrecognized object and the label included in the guide data, based on parameters of the first trained model.

12. The local device of claim 8, wherein the local device corresponds to a mobile robot, and wherein the processor is further configured to:

generate or change route information based on the guide data; and cause the mobile robot to move according to the route information.

13. The local device of claim 8, wherein the local device corresponds to an autonomous vehicle, wherein the processor is further configured to:

generate or change traveling route information based on the guide data; and cause the autonomous vehicle to travel according to the traveling route information, and wherein the first image data and the second image data are map data, and the first spatial information comprises first position information on the first image data.

14. The local device of claim 8, wherein the guide data comprises graphic data generated based on a touchscreen display of the remote device.

* * * * *